(12) United States Patent
Dooley et al.

(10) Patent No.: US 7,232,303 B1
(45) Date of Patent: Jun. 19, 2007

(54) WEAR PLATE LOCKING SYSTEM FOR CASTING AND MOLDING PROCESSES

(75) Inventors: David J. Dooley, Troy, MI (US); Matthey S. Brummer, Canton, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 11/306,084

(22) Filed: Dec. 15, 2005

(51) Int. Cl.
*B29C 33/30* (2006.01)
*B29C 45/26* (2006.01)

(52) U.S. Cl. .................. 425/192 R; 425/195
(58) Field of Classification Search ............ 425/192 R, 425/195
See application file for complete search history.

(56) References Cited

U.S. PATENT DOCUMENTS

| | | | | |
|---|---|---|---|---|
| 2,371,980 A * | 3/1945 | Pritchard | ............... | 164/206 |
| 2,485,290 A * | 10/1949 | Jelinek | ................ | 164/343 |
| 2,649,621 A * | 8/1953 | Moslo | ............... | 425/192 R |
| 3,344,478 A * | 10/1967 | Morse | ................ | 425/357 |
| 3,932,085 A * | 1/1976 | Horbach | ............ | 425/186 |
| 4,150,451 A | 4/1979 | Skierski | | |
| 4,206,799 A | 6/1980 | McDonald | | |
| 4,520,991 A * | 6/1985 | Letica | ................ | 249/122 |
| 4,775,130 A * | 10/1988 | Von Holdt | ........... | 249/144 |
| 5,111,873 A | 5/1992 | Kordovski et al. | | |
| 5,843,492 A | 12/1998 | McCorry | | |
| 6,981,858 B2 * | 1/2006 | Wieder | ............... | 425/107 |

\* cited by examiner

*Primary Examiner*—Robert Davis
*Assistant Examiner*—Marissa W. Chaet
(74) *Attorney, Agent, or Firm*—Earl LaFontaine, Esq.

(57) ABSTRACT

A locking system (12) for a mold (14) includes a first mold half (20), a second mold half (22), and a lock assembly that is coupled to one of the mold halves (20, 22). The lock assembly includes a wear plate (80), that is disposed between the first mold half (20) and the second mold half (22), and an adjustment element (86), which is disposed between the wear plate (80) and one of the mold halves (20,22). The lock assembly also includes a wear plate locking fastener (84), that locks the position of the wear plate (80), and an adjustment fastener (88), which is separate therefrom and adjusts the position of the wear plate (80).

17 Claims, 4 Drawing Sheets

WEAR PLATE LOCKING SYSTEM FOR CASTING AND MOLDING PROCESSES

TECHNICAL FIELD

The present invention relates to die casting and molding processes. More particularly, the present invention is related to the adjustment of wear plates on a mold and the alignment maintenance of mold halves during repeated cycle use thereof.

BACKGROUND OF THE INVENTION

Compression molding is an example high-volume molding process that may be used to produce complex components from a single set of mold halves. In general, a mold consists of a cavity half and a core half. During the compression molding process the alignment of the cavity half and the core half are maintained as the halves are brought together. Prior to the mold being closed, or in other words, prior to the mold halves being completely mated and in contact with each other, material is placed or injected into a mold cavity formed by the mold halves. Inner contour surfaces of the mold halves within a cavity area form the mold cavity. The mold is then compressed or completely closed through applied force to spread the injected material and fill the mold cavity. Pressure is applied until the injected material is cured to form a component in the shape of the mold cavity.

A compression mold assembly typically consists of leader pins and/or guides and compression locks, which are used to align and maintain alignment of the mold halves. The guides provide a semi-tight or rough alignment of the mold halves. The compression locks provide a tight or fine alignment of the mold halves. During the compression molding process the cavity half tends to rub on the guides and the adjacent surfaces of the core half in the compression lock areas. Wear plates have been incorporated in the stated areas to prevent chafing or galling of the contact surfaces of the mold halves. Thus, as the mold closes, the wear plates on the core half rub on and against adjacent surfaces on the cavity half or vice versa. Although the wear plates prevent galling on the mold contact surfaces, they wear over time. The fitting between the mold halves or between the wear plates and the adjacent mold half can become loose in the lock areas. The loose fit results in inaccurate alignment of the mold halves, which causes the mold halves to shift relative to each other. This shift can cause damage to the mold halves or a change in the parting line gap between the mold halves, which in turn can result in scrap parts.

Typically, shims are added to the backside of the wear plates to compensate for the wear on the wear plates. To add the shims the mold is opened and the mold halves are separated. The opening and separation causes the loss of accurate alignment of the mold halves. In addition, it is difficult to determine when, where, and how many shims are needed. The stated determinations can be further hindered due to wear on the guides, and the ability of the guides to be deflected during the closing of the mold. A considerable amount of downtime can be extended in adjusting the position of the wear plates.

Thus, there exists a need for an improved compensation technique in maintaining the consistent alignment of mold halves during a high-volume molding process that minimizes downtime.

SUMMARY OF THE INVENTION

In one embodiment of the present invention a locking system is provided for a mold that includes a first mold half, a second mold half, and a lock assembly. The lock assembly is coupled to one of the mold halves. The lock assembly includes a wear plate, that is disposed between the first mold half and the second mold half. An adjustment element is disposed between the wear plate and one of the mold halves. The lock assembly also includes a wear plate locking fastener that locks the position of the wear plate. In addition, an adjustment fastener, separate from the locking fastener, adjusts the position of the wear plate.

Another embodiment of the present invention provides a method of adjusting locks within a lock assembly of a mold that includes engaging angled locks of the mold. The wear plate is positioned against and in a contact position with one of the mold halves while the mold is in a closed state. The mold is opened. The wear plate is locked in the contact position.

The embodiments of the present invention provide several advantages. One such advantage is the provision of a wear plate for a mold that may be position adjusted while the mold is in a closed state. This allows for accurate placement of the wear plates prior to locking the wear plates in position. The decreases set time of the wear plates.

Another advantage provided by an embodiment of the present invention is the incorporation of angled mold locks. Angled mold locks provide a fine accurate alignment of mold halves without the wear and/or galling commonly associated with the mating of mold halve surfaces.

The above stated advantages provide an efficient, easy, and consistent technique of maintaining alignment of mold halves in a high-volume production process.

The present invention itself, together with further objects and attendant advantages, will be best understood by reference to the following detailed description, taken in conjunction with the accompanying drawing.

BRIEF DESCRIPTION OF THE DRAWINGS

For a more complete understanding of this invention reference should now be had to the embodiments illustrated in greater detail in the accompanying figures and described below by way of examples of the invention wherein.

DETAILED DESCRIPTION

Figure 1:
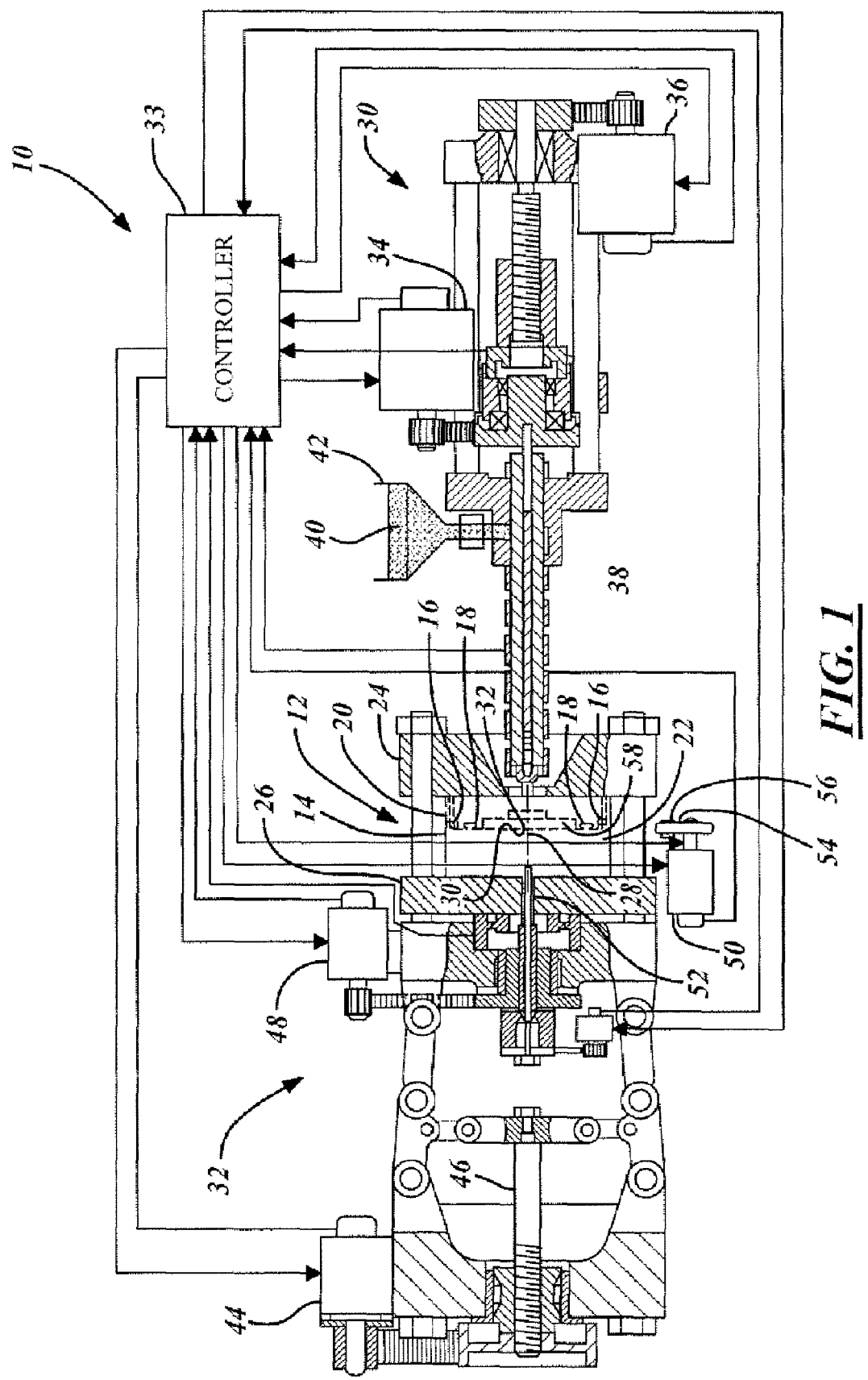
FIG. 1 is a side sectional view of an injection compression molding system incorporating a compression wear plate lock adjustment system in accordance with an embodiment of the present invention.

In each of the following figures, the same reference numerals are used to refer to the same components. While the present invention is described primarily with respect to a mold half alignment technique as applied to an injection/compression molding process, the present invention may be adapted to various processes including injection molding, compression molding, die casting, and other molding and casting processes that utilize multiple mold elements to form one or more mold cavities. The present invention may be applied to molds used to form complex shaped and deep contoured components, such as instrument panels, bumpers, door panels, interior trim panels, and other components known in the art. The present invention may apply to automotive, aeronautical, nautical, railway, commercial, and residential industries, as well as to other industries that utilize similar molding processes.

In the following description, various operating parameters and components are described for one constructed embodiment. These specific parameters and components are included as examples and are not meant to be limiting.

Referring now to FIG. 1, a side sectional view of an injection/compression molding system 10 incorporating a compression wear plate lock adjustment system 12 in accordance with an embodiment of the present invention is shown. The adjustment system 12 has a mold 14 with adjustable compression wear plate locks 16 and angled mold locks 18. The mold 14 has a cavity mold half 20 and a core mold half 22. The cavity mold half 20 is mounted on a stationary platen 24. The core mold half 22 is mounted on a moveable platen 26 that is translated along a mold closing line 28. The core mating surface 30 of the core mold half 22 remains parallel to the cavity mating surface 32 of the cavity mold half 20 during actuation thereof. The mold closing line 28 extends perpendicular to the mating surfaces 30 and 32. The cavity mold half 20 and the core mold half 22 may be mounted on either of the platens 24 and 26.

In operation, as the mold 14 is closed the wear plate locks 16 and the angled mold locks 18 assure proper alignment of the mold halves 20 and 22. The wear plate locks 16 are integrally formed and are attached to one of the halves 20 and 22 and are in contact with the other half when the mold 14 is closed. For example, the wear plate locks 16 may be attached to the core mold half 22 and be in contact with the cavity mold half 20 when the mold 14 is closed or vice versa. The wear plate locks 16 include wear plates that are attached to one of the halves 20 and 22, which is referred to as the lock mounting half, and are in contact with and adjacent to the other half or adjacent half. As the mold 14 is closed wear surfaces of the wear plates rub against the adjacent mold half and overtime form wear gaps therebetween. Adjustability of the wear plate locks compensates for the wear gaps. Sample wear plates are best seen in FIGS. 2–7 and example wear gaps $G_2$ are shown in FIG. 6. The angled mold locks 18 are coupled to the mold halves 20 and 22. The wear plate locks 16, the angled locks 18, and the use thereof is described below in detail with respect to FIGS. 2–8.

The injection compression molding system 10 is shown for example purposes only. The injection compression molding system 10 includes an injection side 30 and a die/part actuation side 32, which are controlled by a controller 33. The injection side 30 includes a rotation servo motor 34 and an injection servo motor 36, which are coupled to and are used to rotate and translate a screw 38. The rotation and translation of the screw 38 causes the resin material 40 from within a hopper 42 to be injected into the mold 14. The injected resin 40, through applied heat and pressure, cures to form a part.

The die/part actuation side 32 includes a die actuation motor 44, which is used to open and close the mold 14. The die actuation motor 44 is coupled to the moveable die 26 via a drive shaft 46. The die actuation motor 44 rotates the drive shaft 46 to translate the core mold half 22, thus, opening or closing the mold 14. The die/part actuation side 32 may also include a part separation motor 48 and a part removal motor 50. The part separation motor 48 is coupled to an ejection member 52, which is used to separate the part from the core mold half 22 upon forming and cooling of the part. The part removal motor 50 is coupled to a part removing arm 54 and a pad 56. The pad 56 is used to grab the part and remove it from the mold 14 upon curing thereof.

During operation of the injection compression molding system 10, the mold 14 is closed by translating the core mold half 22 towards the cavity mold half 20. Before the mold 14 is completely closed, the material 40, which may be in the form of a thermoplastic or thermosetting resin, is injected into the mold cavity 58. The further closing of the mold 14 compresses and thus spreads out the injected material within the mold cavity 58. The wear plate locks 16 maintain alignment of the mold halves 20 and 22 during this injection/compression process. Heat and pressure may be continuously applied until the injected material is cured to form the part.

Figure 2:
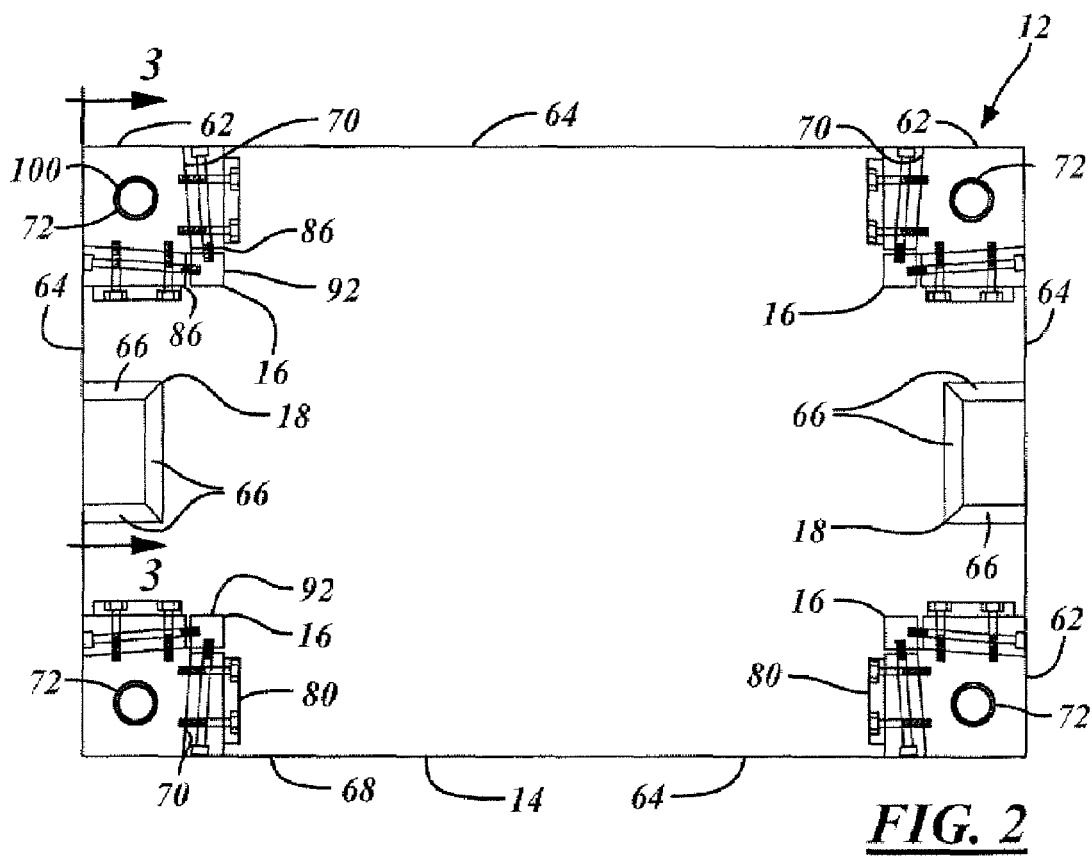
FIG. 2 is a top and block diagrammatic view of a compression wear plate lock adjustment system of FIG. 1.
Figure 7:
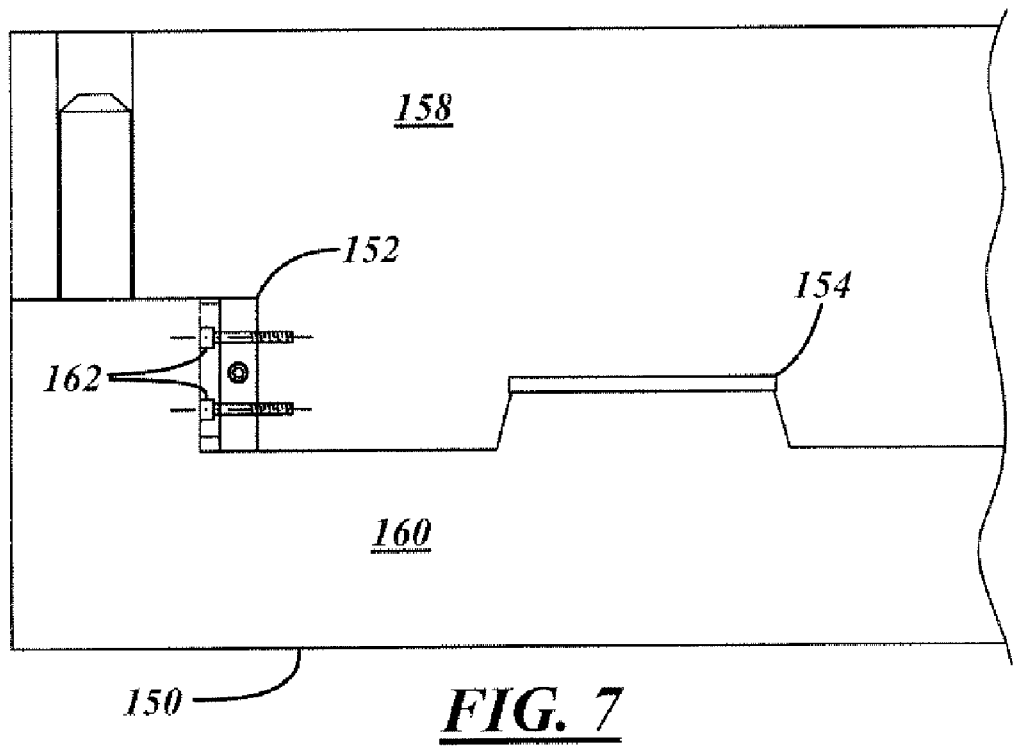
FIG. 7 is a side cross-sectional view of a mold incorporating adjustable compression wear plate locks and angled mold locks in accordance with another embodiment of the present invention.

Referring now to FIG. 2, a top and block diagrammatic view of the compression wear plate lock adjustment system 12 is shown. The lock adjustment system 12 includes the guide pins 60, the wear plate locks 16, and the angled mold locks 18. As the mold 14 is closed, the guide pins 60 provide an initial rough alignment of the core mold half 22 with the cavity core half 20. The wear plate locks 16 provide an intermediate fine alignment of the core mold half 22 with the cavity core half 20. The angled mold locks 18 provide a final precise alignment of the core mold half 22 with the cavity mold half 20 when the mold is in a fully closed state. Although the following is described with respect to the wear plate locks 16 being mounted on the core mold half 22, they may be mounted on the cavity mold half 20, as shown in FIG. 7.

Although a particular number of each of the locks 16 and 18 is shown and the locks 16 and 18 are shown at certain locations on the mold 14, any number of each lock may be used and the locks 16 and 18 may be located in various other locations on the mold 14. The wear plate locks 16 may be located on or at the corners 62 of the mold 14, as shown, or may be located on the sides 64 of the mold 14. The angled mold locks 18 may be located along the sides 64, as shown, or may be located on the corners 62. The angled mold locks 18 may also be located within the mold 14 such that all of the edges 66 of the angle mold locks 18 are within the outer periphery 68 of the mold 14.

Figure 3:
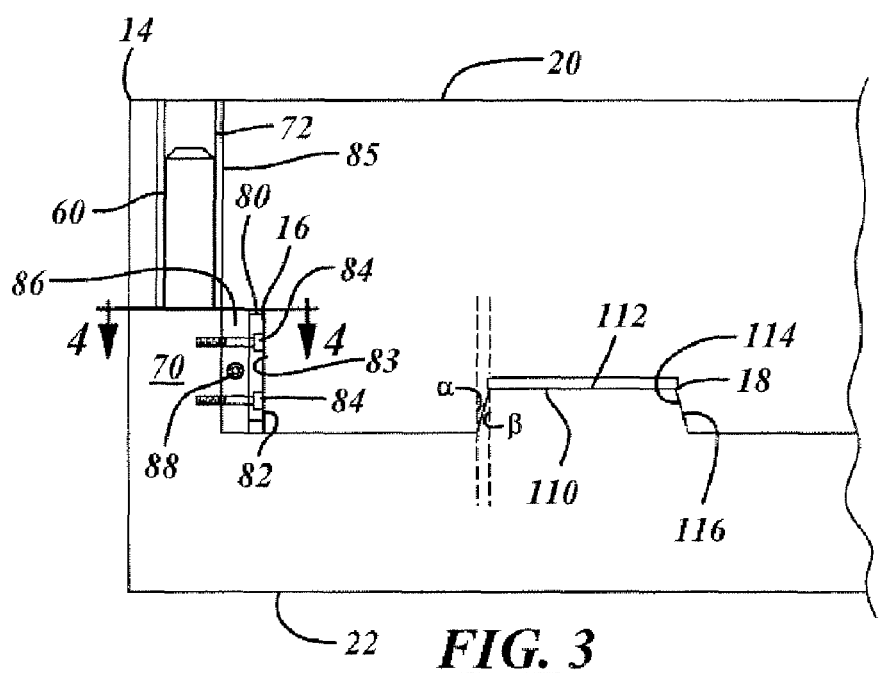
FIG. 3 is a side cross-sectional view of the mold of FIG. 1 as viewed through section A—A of FIG. 2.
Figure 4:
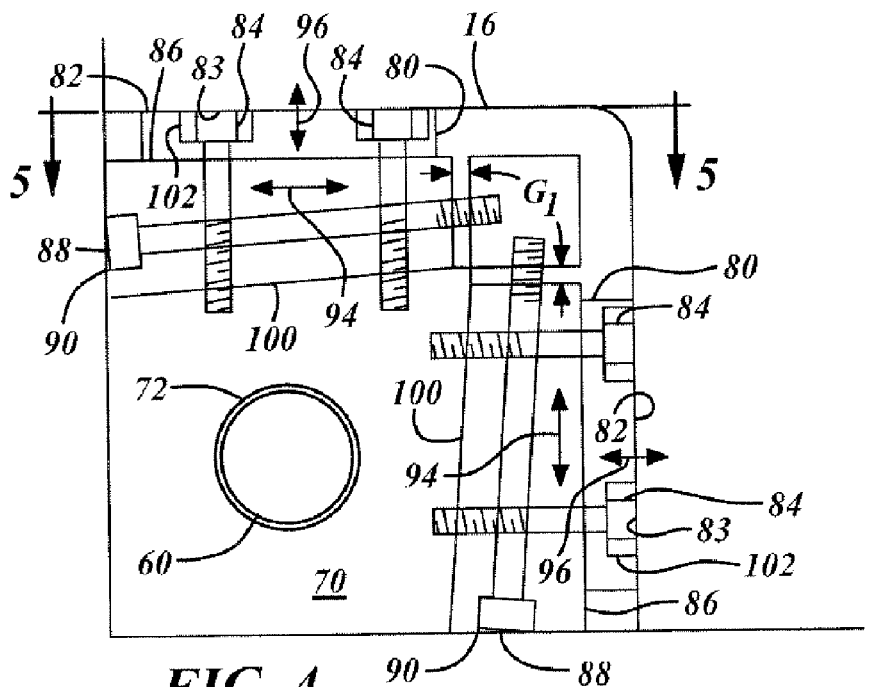
FIG. 4 is a top close-up view of one of the adjustable compression wear plate locks as viewed through section B—B of FIG. 3.
Figure 5:
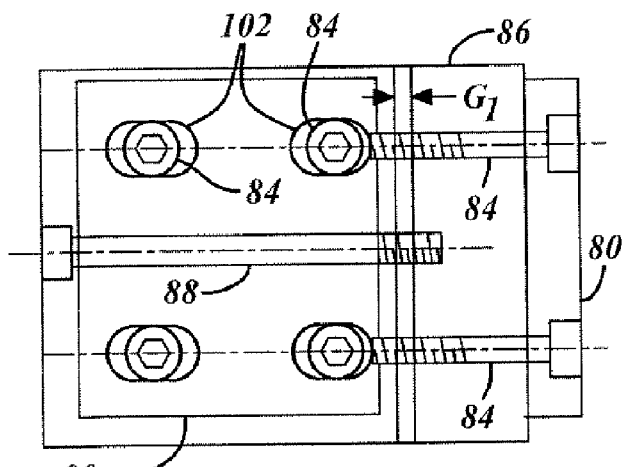
FIG. 5 is a side close-up view of the adjustable compression wear plate lock of FIG. 4 as viewed through section C—C of FIG. 4.
Figure 6:
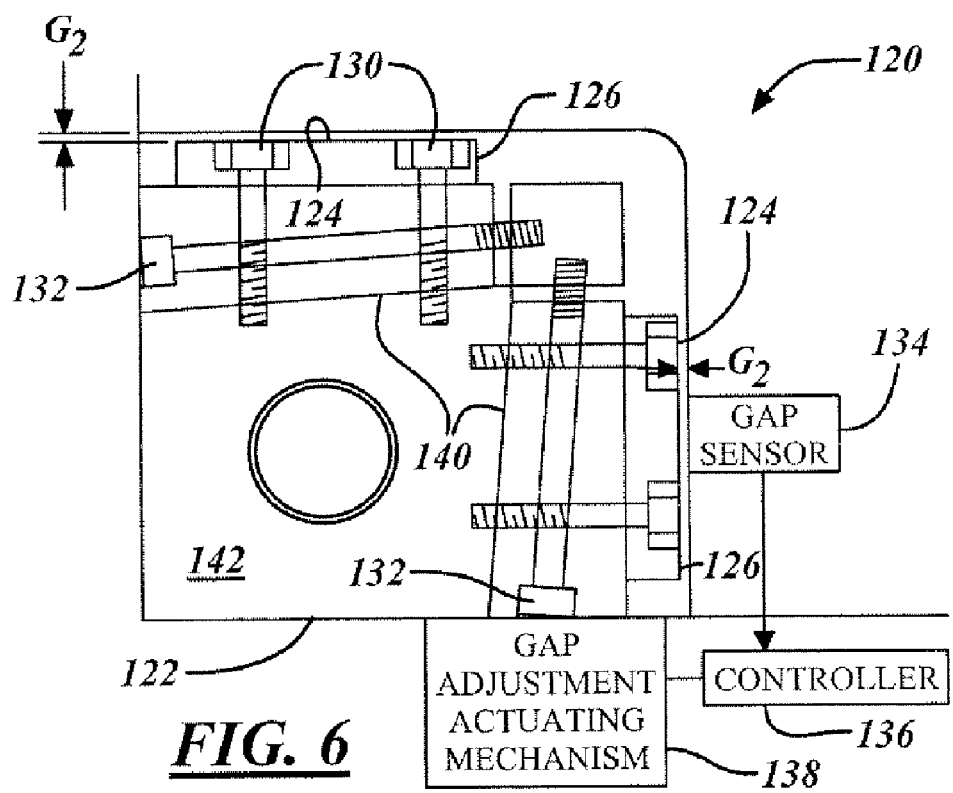
FIG. 6 is a top close-up view of a compression wear plate lock adjustment system illustrating wear gaps and adjustment thereof in accordance with an embodiment of the present invention.

Referring now to FIGS. 3–5, a side cross-sectional view of the mold 14 and a top close-up view and a side close-up view of one of the adjustable compression wear plate locks 16 are shown. The guide pins 60, as shown, extend from lock towers 70, which are integral portions of the core mold half 22. The guide pins 60 extend within pin reception holes 72 in the cavity mold half 20. The guide pins 60 and the pin reception holes 72 may be in various locations on the halves 20 and 22. The guide pins 60 may be located on or off of the lock towers 70 and also or alternatively on the cavity mold half 20 and have respective pin reception holes 72 in the core mold half 22. The guide pins 60 may be of various types, styles, and formed of various materials.

The wear plate locks 16 are in the form of locking assemblies and include one or more wear plates 80 that provide contact rubbing surfaces 82 between the mold halves 20 and 22. Two wear plates in perpendicular relationship are shown per each corner wear plate lock. As the mold 14 is closed the mold contact surfaces 83 of the cavity mold half 22 rub on the contact rubbing surfaces 82. The wear plates 80 are locked in position relative to the core mold half 22 via locking fasteners 84. The position of the wear plates 80 is adjustable via adjustment blocks or elements 86 and wedge adjustment fasteners 88. The adjustment elements 86 are coupled between the wear plates 80 and the lock towers 70 and/or the core mold half 22. In the embodiment shown, the adjustment elements 86 are in the form of wedges. The adjustment fasteners 88 extend through associated recessed holes 90 in the adjustment elements 86 and into the wedge adjustment towers 92. The wedge adjustment towers 92 are an integral portion of the core mold half 22.

The wear plates 80 are, in general, formed of a material that is softer than that of the mold halves 20 and 22 to prevent wear on the mold halves 20 and 22. The surfaces 82 and 83 are formed of dissimilar materials to prevent galling. Although the wear plates 80 are shown in rectangular form, they may be of various shapes. The wear plates 80, the mold halves 20 and 22, and the guide pins 60 may be formed of various materials, such as steel, aluminum, brass, or other suitable materials. In one embodiment, the guide pins 60 are formed of a hardened steel, which is slid into bushings 85 (only one is shown) formed of brass that are located within the cavity mold halve 20, as shown in FIG. 3.

The adjustment elements 86 are tapered to cause the wear plates 80 to shift in a direction approximately lateral or perpendicular to the shift direction of the adjustment elements 86. Arrows 94 show shift directions of the adjustment elements 86. Arrows 96 show shift directions of the wear plates 80. Each adjustment element 86 has a single tapered side 100 adjacent the lock towers 70. This allows for unidirectional shifting of the wear plates 80. In shifting the adjustment elements 86, the adjustment gaps $G_1$ between the wedge adjustment towers 92 and the adjustment elements 86 are increased or decreased in size. The adjustment fasteners 88 are rotated to shift the adjustment elements 86 toward or away from the wedge adjustment towers 92. The shifting of the adjustment elements 86 causes the wear plates 80 to shift toward or away from the lock towers 70 and the cavity mold half 20 as desired. The adjustment fasteners 88 are externally accessible and visible with respect to and when the mold 14 is closed.

The locking fasteners 84 extend through associated slotted holes 102 in the wear plates 80, through the adjustment elements 86, and into the lock towers 70. The locking fasteners 84 lock the wear plates 80 on and in position relative to the lock towers 70. The locking fasteners 84 also lock the adjustment elements 86 into a selected position. The slotted holes 102 allow for unidirectional positioning of the wear plates 80 and the adjustment elements 86 with respect to the lock towers 70. The fasteners 84 and 88 may be in the form of threaded bolts, as shown, or may be in some other form known in the art.

The angled mold locks 18 may be integrally formed as part of the mold halves 20 and 22, as shown. The angled mold locks 18 include a receiving half 110 and a projecting half 112 that engages therewith. The projecting half 112, in effect, is keyed to match the receiving half 110. The projecting half 112 fits within the receiving half 110. In one embodiment, the halves 110 and 112 include angled locking surfaces 114 and 116 that are approximately 15° from the mold closing line 28 and extend along a displacement closing direction of the mold halves 20 and 22. Angles α and β are shown and represent the locking surface angles for the receiving surface 114 and the projecting surface 116, respectively. Of course, angles α and β may be different than that shown depending upon the application. In an alternative embodiment, the receiving half 110 is an integral part of the core mold half 22 and the projecting half 112 is an integral part of the cavity mold half 20.

Referring now to FIG. 6, a top close-up view of a compression wear plate lock adjustment system 120 illustrating wear gaps $G_2$ and adjustment thereof in accordance with an embodiment of the present invention is shown. During repeated use of the mold 122, the wear plate surfaces 124 wear overtime creating the wear gaps $G_2$ between the wear plates 126 and the adjacent mold half 128. The wear gaps $G_2$ may be compensated for through manual or systematic adjustment of the fasteners 130 and 132 in the adjustment system 120.

The adjustment system 120 may include one or more gap sensors 134, a controller 136, and a gap adjustment actuating mechanism 138. The gap sensors 134 are used to detect the size of the wear gaps $G_2$. The controller 136 in response to the wear gap size shifts the wear plates 126 by shifting the adjustment elements 140 via the actuating mechanism 138. The gap sensor 134 may be coupled within one of the mold halves, as shown, or within the wear plates 126, the adjustment elements 140, and the lock towers 142. The gap sensor 134 may be in the form of an infrared sensor, a contact sensor, a radar sensor, an ultrasonic sensor, or other gap or contact sensor known in the art. The gap sensor 134 may also be replaced with a pressure sensor. The position of the wear plates 126 may be adjusted in response to the applied pressure of the wear plates 126 on the adjacent mold half. Although the adjustment mechanism 138 may be coupled to the adjustment fasteners 132 and to the locking fasteners 130. The adjustment mechanism 138 may have linkages, robotic members, motors, and coupling members (all of which are not shown), as well as other devices known in the art for moving, rotating, loosening, tightening, or altering the state and position of the fasteners 130 and 132.

The controller 136 may be microprocessor based such as a computer having a central processing unit, memory (RAM and/or ROM), and associated input and output buses. The controller 136 may be an application-specific integrated circuit or may be formed of other logic devices known in the art. The controller 136 may be a portion of a central main control unit, a control circuit having a power supply, or may be a stand-alone controller as shown.

Referring now to FIG. 7, a side cross-sectional view of a mold 150 incorporating adjustable compression wear plate locks 152 and angled mold locks 154 in accordance with another embodiment of the present invention is shown. The wear plate locks 152 are similar to the wear plate locks 16 and are fastened to the cavity mold half 158 as opposed to the core mold half 160. The lock fasteners 162 extend through the wear plates 164 (only one is shown), through the adjustment elements 166 (only one is shown), and into the cavity mold half 158.

Figure 8:
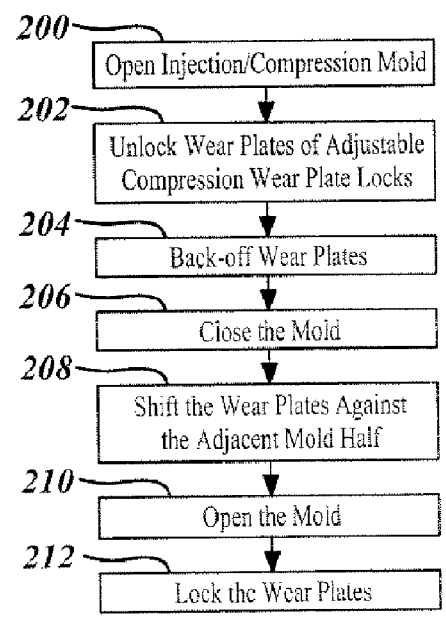
FIG. 8 is a logic flow diagram illustrating a method of maintaining alignment of mold halves in accordance with an embodiment of the present invention.

Referring now to FIG. 8, a logic flow diagram illustrating a method of maintaining alignment of mold halves in accordance with an embodiment of the present invention is shown. This method may be utilized during a high-volume manufacturing or production process.

In step 200, a mold, such as the mold 14, is opened. The opening of the mold provides access to locking fasteners, such as the locking fasteners 84, of adjustable compression wear plate locks, such as the wear plate locks 16.

In step 202, wear plates, such as wear plates 80, of the wear plate locks are unlocked. The locking fasteners are loosened or backed-off to allow for the wear plates to be repositioned. In step 204, adjustment elements, such as the adjustment elements 86, are backed-off to assure that the wear plates are not in contact with the adjacent mold half or mold contact surfaces, such as surfaces 83.

In step 206, the mold is closed and the angled mold locks, such as the angled mold locks 18, are engaged. In step 208, the wear plates are brought into contact with the mold contact surfaces. In one embodiment, the adjustment fasteners are tightened, thereby, shifting the adjustment elements toward the wedge adjustment towers. The shift in the adjustment elements causes the wear plates to be shifted against the adjacent mold half. This position of the wear plates is referred to as the contact position.

In step 210, the mold is opened, thus separating the mold halves. In step 212, the wear plates are locked in the contact position. The locking fasteners are tightened to prevent movement of the adjustment elements and the wear plates.

The above-described steps are meant to be illustrative examples; the steps may be performed sequentially, synchronously, simultaneously, or in a different order depending upon the application.

The present invention provides a quick, easy, and consistent compression lock adjustment system. The present invention eliminates the need for shims as are often utilized between lock towers and wear plates. The present invention maintains accurate alignment between a core mold half and a cavity mold half including during wear plate position adjustment. The present invention allows for the position of the wear plates to be adjusted while the associated mold is in a closed state. This allows one to precisely determine the appropriate position of the wear plates.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A locking system for a mold comprising:
   a first mold half;
   a second mold half; and
   a lock assembly coupled to at least one of said first mold half and said second mold half, said lock assembly comprising;
   at least one wear plate disposed between said first mold half and said second mold half;
   at least one adjustment element disposed between said wear plate and at least one of said first mold half and said second mold half;
   at least one locking fastener locking said at least one wear plate; and
   at least one adjustment fastener separate from said at least one wear plate locking fastener and adjusting position of said at least one adjustment element.

2. A system as in claim 1 further comprising an angled mold lock.

3. A system as in claim 2 wherein said angled mold lock comprises:
   a first angled locking half; and
   a second angled locking half that is fitted within said first angled locking half.

4. A system as in claim 3 wherein said first mold half comprises said first angled locking half and said second mold half comprises said second angled locking half.

5. A system as in 3 wherein said first angled locking half and said second angled locking half comprise angled locking surfaces that are approximately 15° from a mold closing line extending along a displacement closing direction of said first mold half and said second mold half.

6. A system as in claim 1 wherein said at least one wear plate comprises a wear plate selected from at least one of a side wear plate and a corner wear plate.

7. A system as in claim 1 wherein said at least one adjustment element comprises at least one wedge, said at least one adjustment fastener adjusting position of said at least one wedge relative to said second mold half.

8. A system as in claim 1 wherein said at least one adjustment element comprises at least one wedge disposed, said at least one adjustment fastener adjusting position of said at least one wedge relative to said at least one wear plate.

9. A system as in claim 1 wherein said at least one adjustment fastener is extended through said at least one adjustment element and is coupled to said at least one wear plate.

10. A system as in claim 1 wherein said at least one adjustment fastener is accessible from an exterior of the mold.

11. A system as in claim 1 wherein said at least one wear plate comprises:
    a first plate; and
    a second plate perpendicular to said first plate;
    each of said first plate and said second plate having at least one of said at least one wear plate locking fastener and at least one of said at least one adjustment fastener associated therewith.

12. A system as in claim 1 further comprising at least one locking guide coupled to said second mold half and aligning said first mold half with said second mold half.

13. A system as in claim 12 wherein said at least one locking guide comprises a leader pin that extends from said second mold half.

14. A system as in claim 1 wherein said at least one wear plate comprises at least one locking fastener slot for position adjustment of said at least one wear plate relative to said at least one locking fastener.

15. A locking system for a mold comprising:
    a first mold half;
    a second mold half;
    a lock assembly coupled to at least one of said first mold half and said second mold half,
    said lock assembly comprising;
    at least one wear plate disposed between said first mold half and said second mold half;
    at least one wear plate locking fastener; and
    at least one adjustment fastener separate from said at least one wear plate locking fastener and adjusting position of said at least one wear plate; and
    an angled mold lock comprising;
    a first angled locking half; and
    a second angled locking half that is fitted within said first angled locking half.

16. A system as in claim 15 further comprising:
a wedge adjustment tower; and
at least one wedge adjusting fastener coupled to said wedge adjustment tower and adjusting position of said at least one wedge relative to at least one of said first mold half and said second mold half.

17. A system as in claim 15 comprising:
a lock tower coupled to at least one of said first mold half and said second mold half;
a plurality of corner wear plates;
a plurality of wedges; and
a plurality of wedge adjustment fasteners coupled to said plurality of wedges and adjusting position of said plurality of wear plates relative to said lock tower.

\* \* \* \* \*